(12) United States Patent
Lorenz

(10) Patent No.: US 6,837,441 B1
(45) Date of Patent: Jan. 4, 2005

(54) THERMOSTAT WITH CLOCK-BURST CONTROL OF TRIP POINT

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 19 days.

(21) Appl. No.: 10/618,437

(22) Filed: Jul. 11, 2003

(51) Int. Cl.$^7$ ............................................. G05D 23/00
(52) U.S. Cl. ..................... 236/79; 236/46 F; 62/157; 62/259.2
(58) Field of Search ........................... 236/79, 46 F, 67; 62/157, 231, 259.2; 361/688

(56) References Cited

U.S. PATENT DOCUMENTS 5,586,270 A * 12/1996 Rotier et al. ................. 710/301

* cited by examiner

*Primary Examiner*—Marc Norman
(74) *Attorney, Agent, or Firm*—Timothy P. Sullivan; Merchant & Gould

(57) ABSTRACT

The present invention is directed at a thermostat using a clock burst to control a temperature trip point without the use of an external resistor. A clock burst is applied to a clock input pin from which a counter is used to count the number of pulses. The output of the counter is used to drive a DAC that sets the trip point. No external resistor is needed. This trip point provides a low pin count, flexibility, and high accuracy.

21 Claims, 2 Drawing Sheets

THERMOSTAT WITH CLOCK-BURST CONTROL OF TRIP POINT

FIELD OF THE INVENTION

The present invention relates to electronic circuits, and more specifically to setting a trip point.

BACKGROUND OF THE INVENTION

Temperature is an often-measured environmental quantity. This might be expected since most physical, electronic, chemical, mechanical and biological systems are affected by temperature. Some processes work well only within a narrow range of temperatures; certain chemical reactions, biological processes, and even electronic circuits perform best within limited temperature ranges. When these processes need to be optimized, control systems that keep temperature within specified limits are often used. Temperature sensors provide inputs to those control systems.

Many electronic components can be damaged by exposure to high temperatures, and some can be damaged by exposure to low temperatures. Semiconductor devices and LCDs (Liquid Crystal Displays) are examples of commonly used components that can be damage by temperature extremes. When temperature limits are exceeded, action must be taken to protect the system. In these systems, temperature sensing helps enhance reliability. One example of such a system is a personal computer. The computer's motherboard and hard disk drive generate a great deal of heat. The internal fan helps cool the system, but if the fan fails, or if airflow is blocked, system components could be permanently damaged. By sensing the temperature inside the computer's case, high-temperature conditions can be detected and actions can be taken to reduce system temperature, or even shut the system down to avert catastrophe.

Many systems set a temperature trip point that is used to trigger the system that a predetermined temperature has been exceeded. An external resistor is typically used to set the temperature trip point. The external resistor controls the chip's temperature trip point. By selecting the appropriate value of resistor, the customer may set the trip point for the chip.

This solution, however, is not very accurate. Resistor tolerance and the resistor's temperature coefficient add to the trip point tolerance. One problem is that the temperature coefficient is not only one direction but is plus-or-minus some value. Using common and inexpensive resistors, such as 1% resistors with a +/−100 ppM TC (Temperature Coefficient) can contribute up to 70% of the trip point tolerance.

What is needed is a way to tighten the trip point tolerance.

DETAILED DESCRIPTION OF THE PREFERRED EMBODIMENT

Figure 1:
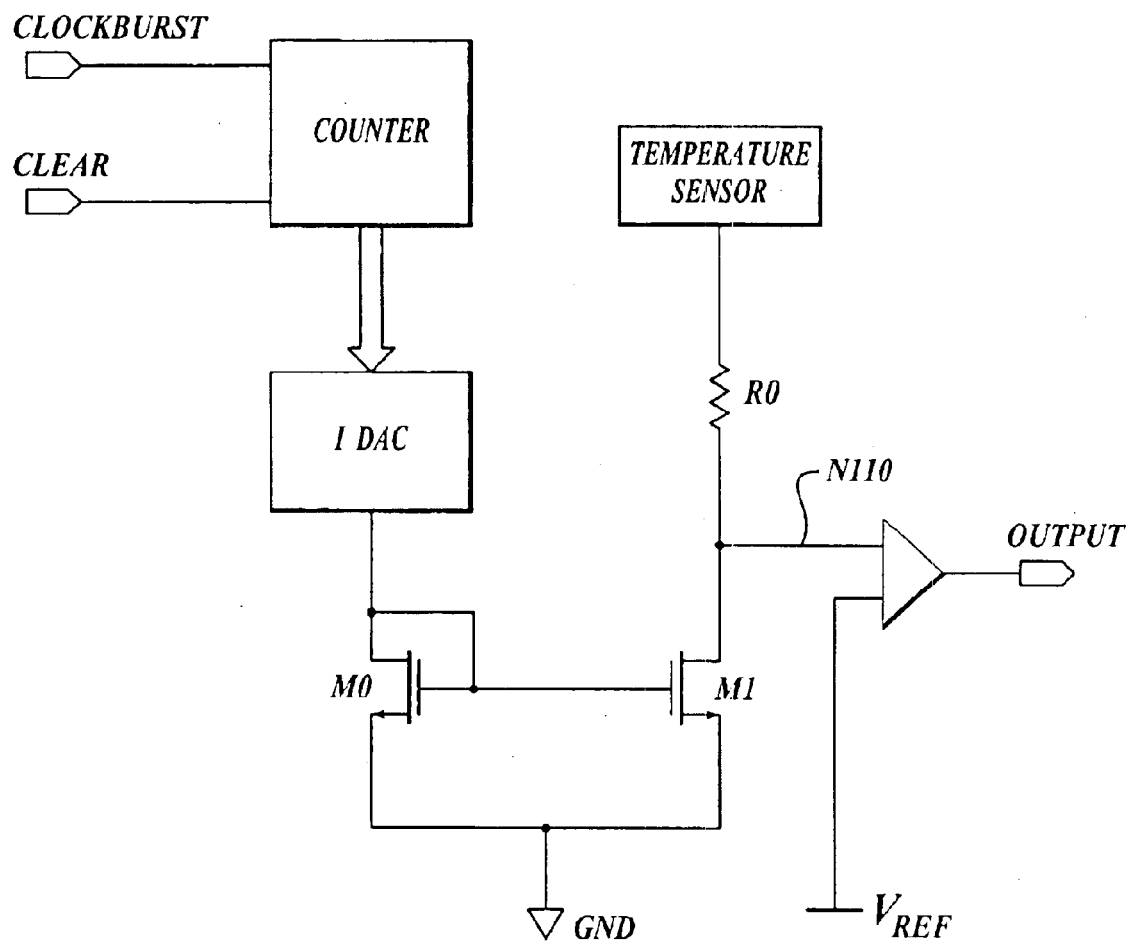
FIG. 1 illustrates a diagram of a clock-burst control trip point circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The terms "comprising," "including," "containing," "having," and "characterized by," mean an open-ended or inclusive transitional construct and does not exclude additional, unrecited elements, or method steps. For example, a combination that comprises A and B elements, also reads on a combination of A, B, and C elements. The present invention is directed at using a clock burst to control a temperature trip point without the use of an external resistor. A clock burst is applied to a clock input pin from which a counter is used to count the number of pulses. The output of the counter is used to drive a DAC (Digital to Analog Converter) that sets the trip point. No external resistor is needed. This technique provides a low pin count, flexibility, and high accuracy.

A problem with using external resistors to set the trip point is that resistor tolerance and its temperature coefficient adds to the tolerance of the trip point. Using common and inexpensive 1% resistors with +/−100 ppM TC can contribute up to 70% of the trip point tolerance. The present invention is directed at removing this tolerance.

FIG. 1 illustrates a diagram of a trip point circuit utilizing a clock burst; in accordance with aspects of the invention. As illustrated in the figure, trip point circuit 100 includes a counter, an I DAC (current DAC), transistors M0 and M1, a temperature sensor, resistor R0, and a comparator.

Referring to FIG. 1 it can be seen that no external resistor is used to set the trip point. Not only does this save the cost of a component, this eliminates the tolerance due to the resistor thus delivering higher accuracy.

The operation of FIG. 1 will now be described. A clock-burst signal is applied to an input of the counter. According to one embodiment of the invention, a clock burst from 0 to 255 is used, thereby providing 256 possible trip points. Each pulse received by the counter corresponds to a different temperature. According to one embodiment, each pulse corresponds to a single degree providing a temperature range of 256 degrees. This could result in a temperature range from −55° C. to 200° C.

According to other embodiments, the clock burst may provide higher or lower resolution. For example, two or more clock pulses could correspond to a single degree, thereby providing higher resolution for a narrower temperature range. Similarly, a clock pulse may correspond to two degrees, thereby decreasing the resolution but increasing the temperature range. Additionally, different clock-burst signals may be generated affecting the resolution.

In response to the clock-burst signal, the counter counts the pulses then outputs a signal to the I DAC that corresponds to the count. In response to the count, the I DAC outputs a current corresponding to the desired trip point which is coupled to node N110. For example, when each clock pulse corresponds to a degree, and the counter counts to fifty, then the trip point corresponds to a predetermined temperature plus fifty. According to one embodiment, the predetermined temperature is the temperature at the lower end of the chosen temperature range.

The temperature signal is configured to output a temperature signal at node N110.

The comparator compares the signal at node N110 with a reference signal to determine when the trip point has been tripped. According to one embodiment, the reference signal ($V_{REF}$) is set at about 400 mV such that it provides headroom for transistor M1.

According to one embodiment, the trip point is set once at power-up. In other words, the clock-burst signal is applied to the pin when the circuit is powered-up. The trip point, however, may also be set at other times during operation of the circuit providing more information to the user. The trip point could be set at various trip points until the trip code, and the next step higher, for which it does not trip, is determined. This constitutes a measurement of the present temperature of the circuit. For example, the trip point could initially be set at 50° C. and then when the circuit trips, the counter may be cleared using the clear input to the counter and a new clock burst applied thereby setting the trip point to another temperature. The trip point could also be set at each of the 256 degrees providing more temperature information relating to the circuit.

The ability to actively set the trip point also allows the customer to test the system's response to an over temperature condition even though the system is at room temperature.

Figure 2:
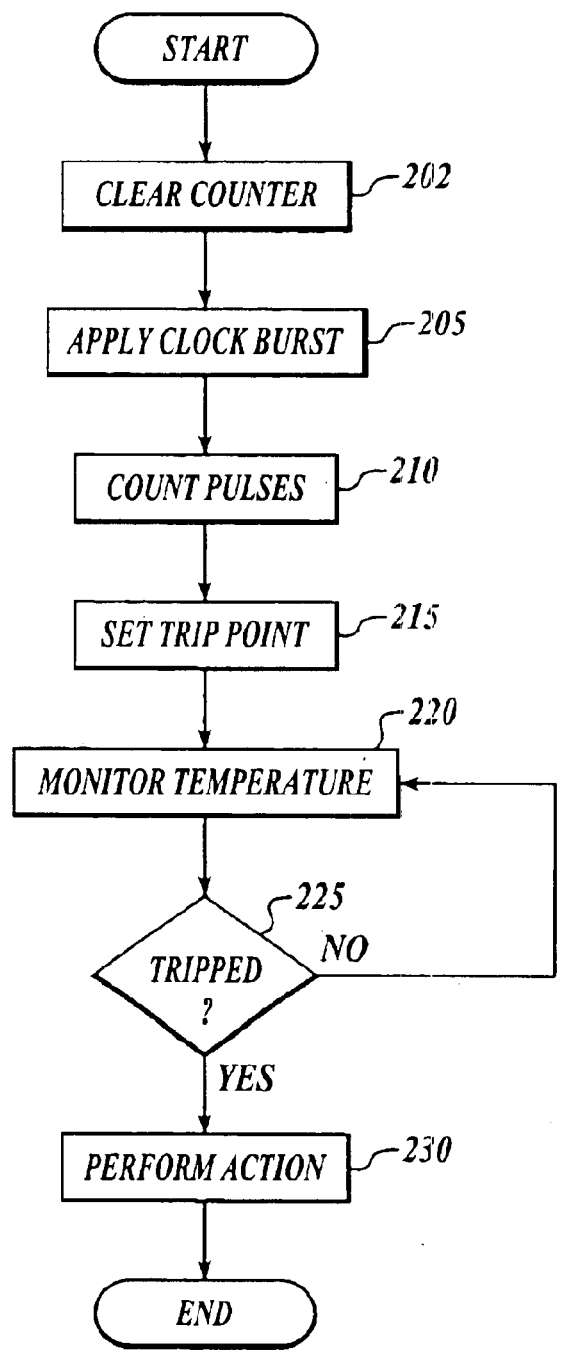
FIG. 2 illustrates a process for setting a trip point using a clock burst, in accordance with aspects of the invention.

FIG. 2 illustrates a process for setting a trip point using a clock burst, in accordance with aspects of the invention.

After a start block, the process moves to block 202 where the counter is cleared. Flowing to block 205, a clock burst is applied. Moving to block 210, the number of pulses within the clock burst is counted. Transitioning to block 215, the trip point is set. According to one embodiment, a DAC is driven by the count to generate a trip signal corresponding to the trip point. Flowing to block 220, the temperature is monitored. Moving to decision block 225, a determination is made as to whether the trip point has been tripped. When tripped, the process flows to block 230 where a predetermined action occurs. The predetermined action may be many different actions. For example, a fan may come on to help cool the circuit, the circuit may be shut down, the circuit may go into a low-power mode, and the like. When the circuit has not tripped, the process returns to block 220. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for controlling a trip point associated with a circuit; comprising:

a counter configured to receive a clock burst and output a count signal corresponding to a desired trip point;

a DAC configured to receive the count signal, and in response, output a trip point signal;

a temperature sensor configured to output a temperature signal; and a comparator coupled to the DAC and temperature sensor and configured to determine when the desired trip point is tripped.

2. The apparatus of claim 1, wherein the clock burst provides about 256 trip points.

3. The apparatus of claim 1, wherein the clock burst further comprises pulses.

4. The apparatus of claim 3, wherein each of the pulses corresponds to a temperature.

5. The apparatus of claim 3, wherein the counter is configured to count the pulses associated with the clock burst.

6. The apparatus of claim 5, wherein the desired trip point is set by adding the counted pulses to a predetermined temperature.

7. The apparatus of claim 1, wherein the counter further comprises a clear input configured to receive a signal to clear the counter.

8. The apparatus of claim 7, wherein the desired trip point is under active control allowing different trip points to be set at various times during operation of the circuit.

9. The apparatus of claim 7, wherein the desired trip point is set at power up of the circuit.

10. The apparatus of claim 1, wherein the trip point signal is a current relating to the count.

11. A method for controlling a trip point associated with a circuit; comprising:

clearing a counter;

applying a clock burst;

setting the trip point based on the clock burst;

monitoring a temperature associated with the circuit; and determining when the trip point is tripped.

12. The method of claim 11, further comprising performing a predetermined action when the trip point is tripped.

13. The method of claim 12, wherein the predetermined action may include at least one of the following: shutting down the circuit; changing the power mode of the circuit; and adjusting a fan.

14. The method of claim 11, wherein applying the clock burst is performed at power-up of the circuit.

15. The method of claim 11, wherein applying the clock burst is performed during operation of the circuit.

16. The method of claim 11, wherein setting the trip point based on the clock burst further comprises counting a number of pulses within the clock burst.

17. The method of claim 16, wherein setting the trip point based on the clock burst further comprises driving a DAC to generate a current in response to the counted number of pulses.

18. The method of claim 11, further comprising testing a response of the circuit to an over temperature condition when the circuit is at a temperature below the over temperature condition.

19. An apparatus for controlling a trip point associated with a circuit; comprising:
- means for clearing a counter;
- means for applying a clock burst;
- means for setting the trip point based on the clock burst;
- means for monitoring a temperature associated with the circuit; and
- means for determining when the trip point is tripped.

20. The apparatus of claim 19, further comprising means for performing a predetermined action when the trip point is tripped.

21. The apparatus of claim 19, wherein the means for applying the clock burst further comprises means for applying the clock burst during operation of the circuit.

* * * * *